Sheet 1-2 Sheets.
C. Duckworth.
Loom.
No. 2,018. Reissued Jul. 4, 1865.
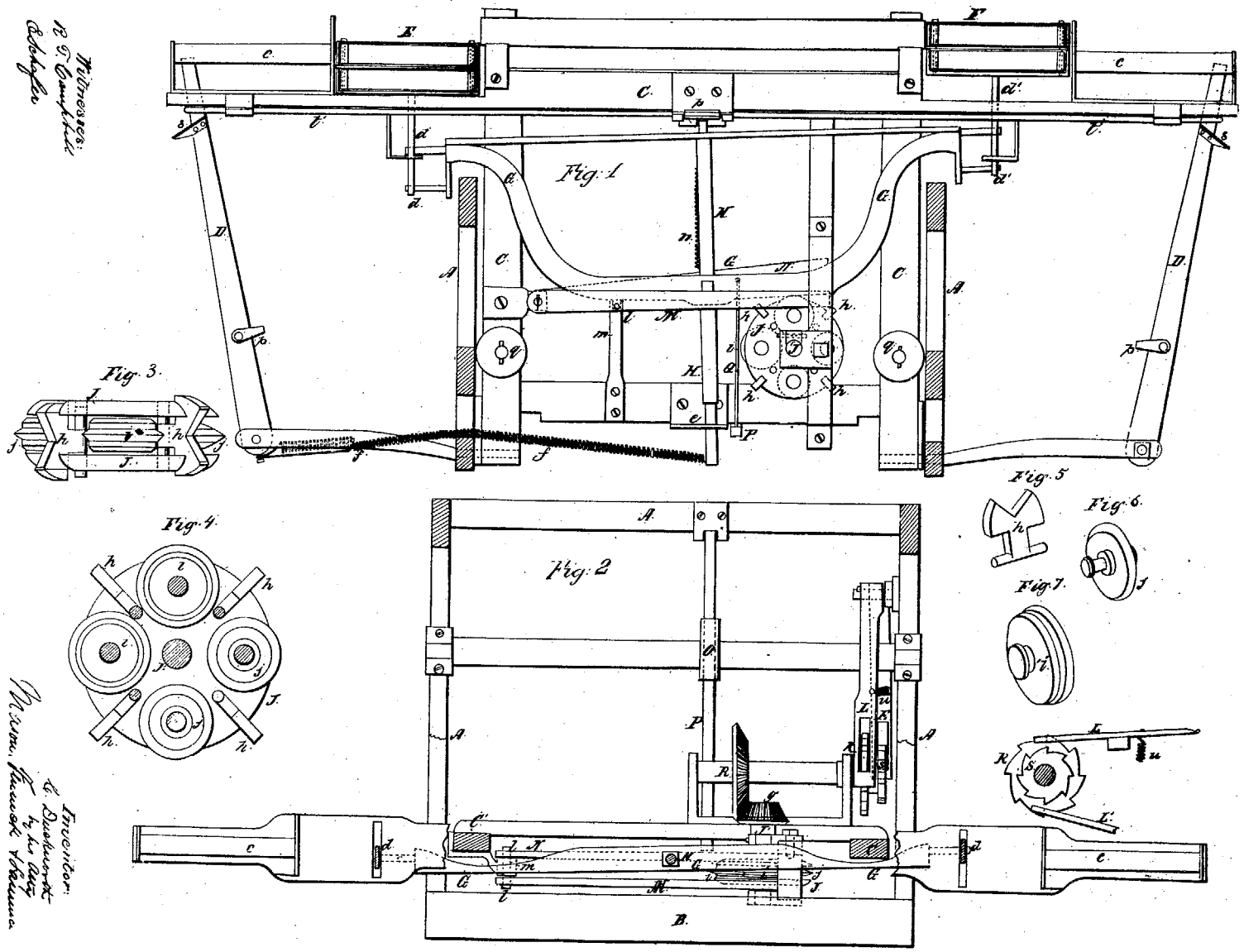
Witnesses:
R. T. Campbell
C. Schafer
Inventor:
C. Duckworth
by his Atty
Mason, Fenwick & Lawrence Sheet 2 - 2 Sheets.
C. Duckworth.
Loom.
No. 2,018. Reissued Jul. 4, 1865.
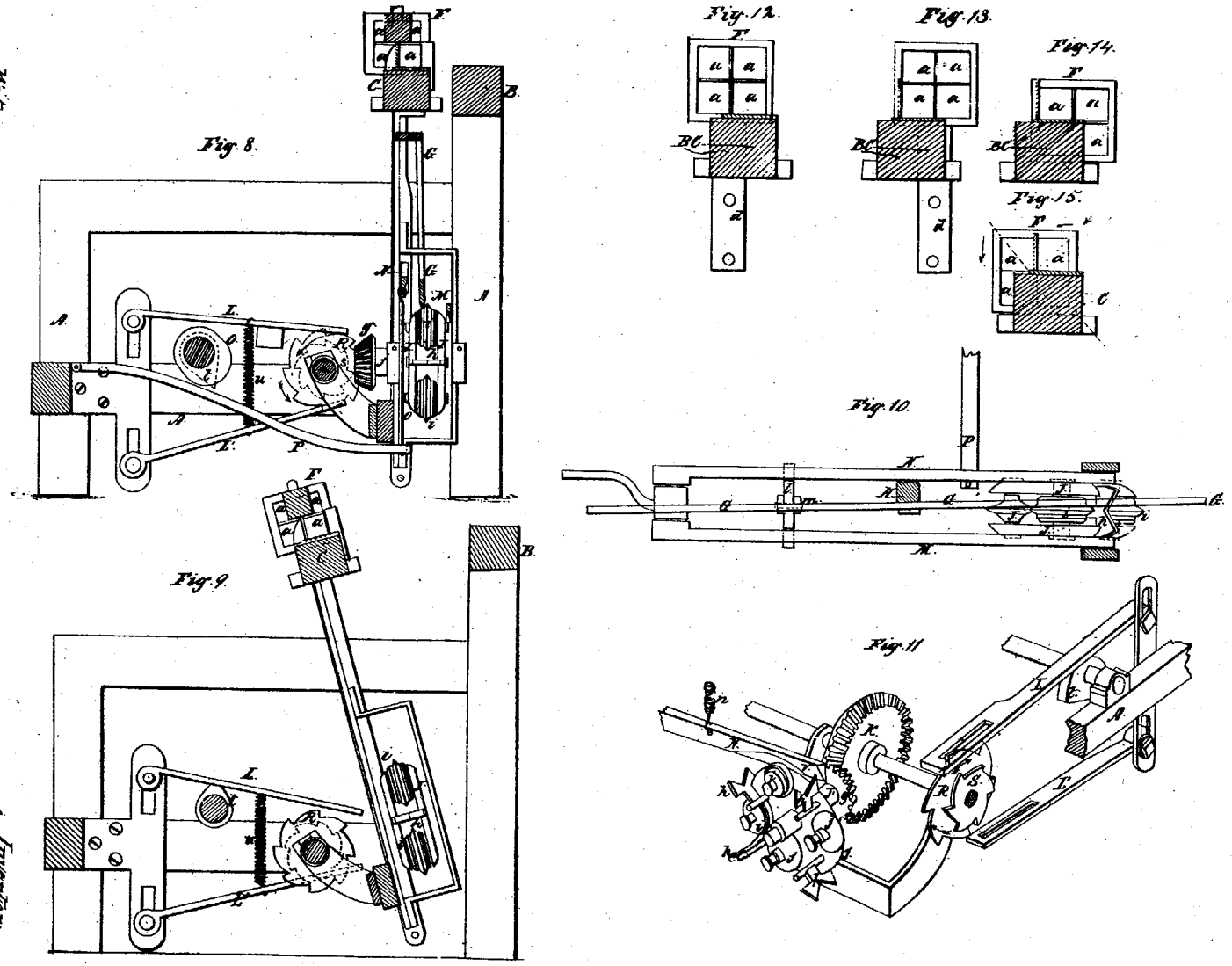
Witnesses:
R. T. Campbell
Inventor:
C. Duckworth
by his Atty
Mason, Fenwick & Lawrence

UNITED STATES PATENT OFFICE.

CHRISTOPHER DUCKWORTH, OF MOUNT CARMEL, CONNECTICUT.

IMPROVEMENT IN LOOMS.

Specification forming part of Letters Patent No. 9,815, dated June 28, 1853; Reissue No. 2,018, dated July 4, 1865.

DIVISION NO. 1.

*To all whom it may concern:*

Be it known that I, CHRISTOPHER DUCKWORTH, of Mount Carmel, in the county of New Haven and State of Connecticut, have invented certain new and useful Improvements on Power-Looms for Weaving Figured Fabrics; and I do hereby declare that the following is a full, clear, and exact description of that part of my invention which relates to Division No. 1, reference being had to the accompanying drawings, making a part of this specification, in which—

Figure 1, Sheet 1, is a front elevation of those parts of a power-loom to which my invention relates. Fig. 2, Sheet 1, is a horizontal section through Fig. 1, taken immediately beneath the race-beam. Figs. 3, 4, 5, 6, and 7 are views in detail of the devices which take part in effecting the changes of position of the shuttle-boxes. Fig. 8, Sheet 2, is a longitudinal section through the center of the loom, with the beveled spur-wheel omitted. Fig. 9, Sheet 2, is a similar section showing the same parts in different positions. Fig. 10, Sheet 2, is a top view of the levers which give a horizontal lateral movement to the shuttle-boxes, either backward or forward. Fig. 11, Sheet 2, is a perspective view showing the pawls, ratchet-wheels, and spurred gearing which move the tappets about their common center, either to the right or to the left. Figs. 12, 13, 14, and 15 show the changes of position of a four-celled shuttle-box.

Similar letters of reference indicate like parts in the several figures.

My invention relates particularly to looms for weaving figured fabrics wherein more than two colors are required in the weft, and wherein it is necessary to employ a number of shuttles corresponding to the number of colors used and to change the positions of the shuttle-boxes with respect to the race-beam, according to the figure which it is desired to weave.

The object of my invention is to provide for throwing shuttles from a combination of shuttle boxes or cells, both in regular or irregular order, so that a great variety of combinations can be made with but few colors and few shuttles carrying such colors.

In looms hitherto constructed having a number of shuttle-boxes corresponding to the number of shuttles employed on each side of the lathe, it is necessary to throw the shuttles in regular order of arrangement, and while provision is made for giving these boxes alternate movements for the purpose of obtaining a repetition of a certain number of colors previously used, there is no provision made to pass by or skip a box which is next that from which the last shuttle was thrown. Thus, while different colors can be repeated in regular succession or regular order of arrangement any number of times by giving the boxes an alternate movement, such movement will not admit of the taking of any desired color at will, as the operation of the machine is limited to the taking of only such colors as range in regular succession. If, for example, the color red was thrown, and it was desired to succeed it with white, unless the latter color was in the box next the red it could not be thrown until the color in the intermediate box or boxes was thrown; hence with such looms it is necessary to employ a great number of shuttles to weave a simple figure of but few colors.

To enable others skilled in the art to understand my invention, I will describe its construction and operation.

The frame A, the breast-beam B, the lathe C, and the picker-staves D D may be constructed in any of the well-known ways used in power-looms. The shuttle-boxes E and F are subdivided by partitions, so as to form a number of cells, *a a a a*, for containing the shuttles, and these boxes are so arranged that they are susceptible of receiving a lateral, a vertical, and a diagonal movement when necessary to bring the required shuttle to the position to be acted upon by the picker-staves D D, which latter give an alternate reciprocating motion to their respective bolts or rods, which are inclosed within the horizontal tubes *c c*.

The shuttle-boxes E F are supported upon upright standards *d d'*, Figs. 1 and 2, which standards are acted upon by means of pins projecting from the extremities of a curved rocking lever, G. This lever G is secured at its center to a swinging bar, H, which is supported in a free bearing at its upper end, (attached to the race-beam of the lathe,) while its lower end is movable laterally in a slotted plate, *e*, and is pressed toward the left by the spiral spring *f*, so as to cause the lever G to bear in the center of the notches in the slides *h*, and rest on the friction-rollers *i i* and *j j* contained in the circular case, J. This case J, with its friction-rollers, is revolved or oscillated, when necessary, by the bevel gear-wheels K *g*, Figs. 2, 8, and 11, the wheels being worked by the dogs or pawls L L′ and ratchet-wheels R S, Figs. 8 and 11, by the vibratory motion of the lathe C, to which latter the case J, wheels K and *g*, and the ratchet-wheels are all attached.

The two pawls L L′ may for some purposes be worked by a cam, as shown at *t*, Figs. 8, 9, and 11, which cam will raise the pawl L from the ratchet-wheel R, which, by means of the spiral spring *u*, will lift the pawl L′ against the ratchet-wheel S so as to move the case J about its axis in one direction, contrary to that in which it is moved when the pawl L is allowed to act upon the ratchet-wheel R; but instead of using a single cam, *t*, to act upon the pawls L L′, I shall in most, if not all cases, employ a "pattern-card" or "card-pattern" for moving and controlling the movements of said pawls.

The case J carries four friction-rollers, *i i j j*, the forms of which are particularly shown in Figs. 6 and 7, sheet 1. The object of making these portions of a circular form and allowing them to turn freely, is merely to avoid friction and wear when their surfaces are caused to act upon the lever G. The case J is also furnished with four notched slides, *h*, the notches of which guide the lever G laterally as it falls into them. These slides *h* are moved from one side to the other of the center of the case J by means of two levers, M and N, when either one of these levers is depressed so that its beveled edge comes in contact with projecting portions of these slides. (Shown in Figs. 3 and 5.) The slides *h* have sufficient end play to carry the lever G from one side to the other of the central prominences of the tappets or friction-rollers *i i j j*, and thereby cause this lever to give the lateral motions to the shuttle-boxes as the levers M and N are alternately depressed. The friction-rollers *i i j j* are used for giving a vertical up and down movement to the shuttle-boxes of a greater or less stroke, according to the diameter of these rollers and the distance of their outer edges from the axis of the shaft J′, and the slides *h h* are used for giving a lateral or horizontal movement to the shuttle-boxes; both devices operate as tappets upon the lever G, which carries on its extremities the shuttle-boxes.

The levers M and N are pivoted to a bracket, which is secured to the left-hand sword of the lathe, and these levers are connected together by a short lever, *l*, which rocks on a fulcrum, *m*, so that when one lever is depressed the other will be elevated. The lever N is elevated by the recoil of the spiral spring *n*, the upper end of which is attached to the under side of the race-beam of the lathe C, and the lower end to the lever N, as seen in Fig. 1; and this lever is depressed by the action of the cam O on the lever P by means of the connecting-rod Q, and by the operation of the lever M is depressed, and vice versa, so far as rocking-lever *l*; when lever N is elevated the the cam O is concerned in the operation while working alone. This cam O may be shifted or adjusted to any desired position so as to operate the levers M and N, as required, to the extent to which a single cam can be used; but I prefer to control the operation of the levers M and N by means of a "card-pattern" instead of a single cam surface, as shown.

When a card-pattern is employed, the cam O is dispensed with, and the operation of the levers governed wholly by the pattern, the operation of the rocking-lever *l* being to prevent both levers M N from being depressed simultaneously, while the operation governed by the pattern may be to hold up either one of the levers for any desired length of time.

On the arbor of wheel K, I key two ratchet-wheels, R and S, for the purpose of revolving this wheel K either way, by means of the vibratory motion given to the lathe C, and the stationary pawls L L′, acting alternately upon their respective ratchet wheel, as represented in Figs. 8 and 9, Sheet 2. The pawls L L′ are pivoted at their rear ends, so as to allow their forward ends freedom to be vibrated by the cam *t* or a card-pattern mechanism. Either one of these pawls may be raised or depressed, or both may be disengaged from the ratchet-wheels when not needed by any of the common methods used in looms to direct the form of the figure to be woven, though they must be governed by a card-pattern either directly or indirectly.

The power for working the lathe C may be applied in any of the well-known ways, so as to revolve the main shaft, which latter communicates a rotary motion to the shaft carrying the cam O through the medium of spurred gearing, which I have not represented in the drawings.

When power is applied to the main driving-shaft, the lathe C receives a vibratory motion for beating up the woof or filling. This vibratory motion of the lathe causes the ratchet-wheels R S to be revolved by the pawl L in the direction indicated by the arrow in Fig. 8, and to carry with it the bevel spur-wheel K, which, by means of the pinion *g* on the shaft J′, revolves or moves the case J toward the right by a repeated movement; and when the other pawl, L′, is brought into action, as in Fig. 9, Sheet 2, the motion of the lathe C causes the ratchet-wheel S to revolve in the direction indicated by the arrows on this wheel in Fig. 9, and carries with it the wheel K, which, by means of pinion *g*, moves the case J over toward the left by a repeated movement, so as to bring the notched slides *h* and friction-rollers *i i j j* alternately or successively under the lever G, to guide it and to rock it, so as to alternately depress and elevate the shuttle-boxes E F, or to give them a vertical motion. While this takes place the shaft of cam O will be revolved, and this cam will be caused to depress the lever P once in every revolution, and by means of the connecting-rod Q depress the lever N so that its beveled edge will force the notched slides *h* outward, and thus guide the lever G outside of the prominences on the rollers or tappets *i i j j*, and thus give the lateral movement to the shuttle-boxes, carrying the box E backward and bringing the box F forward. When the shortest side of the cam O is downward the spiral spring *n*, Fig. 1, will raise the lever N above the ends of the slides *h*, and by the operation of the transverse lever *l* the lever M will be correspondingly depressed unless sustained by the governing effect of a card-pattern, so that its beveled edge will come into contact with the beveled edges or ends of the notched slides *h* and force these slides back, and thereby guide the lever G to the back side of the central prominences on the friction-rollers or tappets *i j*, and cause this lever to carry the shuttle-box F backward and bring box E forward, thus giving a lateral movement to the shuttle-boxes opposite to that before described.

When the change in the slide to give the lateral or horizontal movement to the boxes coincides with a change in the friction-rollers or tappets—as from the large rolling-tappet *i* to the small rolling-tappet *j*, or vice versa, to give the vertical movements—the vertical and lateral movements occurring simultaneously, will produce the diagonal motion, as from corner to corner of the shuttle-boxes, as indicated by the red lines, Fig. 15.

The slides *h* and rollers or rolling-tappets *i i j j*, when the levers N M and pawls L L′ are properly controlled in their movements, will cause the lever G to produce every change of position of the shuttle-boxes required to weave the desired figure. The case J may remain at rest during any number of throws of either one of the shuttles; and this case may be rotated forward or backward, as one or the other of the pawls L L′ and ratchet-wheels R S are used, and when the pawl L and the ratchet-wheel S are used the inclined surface *v*, Fig. 11, willo perate the notched slides *h*. When I employ a card-pattern, I connect it with the pawls L L′ and the levers M N by any of the well-known means now in use for similar purposes, according to the construction of the loom.

The picker-staves D D may be operated in any of the well-known ways—as, for instance, by bands or straps attached at *p p* and carried over the pulleys *q q*, Fig. 1, and worked by a treadle or any other convenient way.

The loom may be stopped when the shuttles are not thrown home into the boxes by the lip or projection *r*, Fig. 1, which is thrown by a spring in the usual manner, coming in contact with the breast-beam B; and when the shuttle is thrown home into the boxes the inclined planes *s s*, acting on the bent ends of the protecting-rod *t′*, will press the lip *v* down, so that it will pass under the breast-beam B and allow the lathe to work freely.

The rollers *i i* and *j j*, and also the notched slides *h h*, all operate as tappets upon the lever G to oscillate this lever either vertically, or horizontally, or diagonally. It is important in the operation of these tappets to be able to rotate the case J either to the right or to the left, and this movement may be oscillatory—*i. e.*, the case J sometimes moving the distance of one, two, or three of the tappets, and then returning again to the position from which it started or to any intermediate tappet; and then again, the case J may make a complete revolution. When both pawls L L′ are disengaged from their ratchet-wheels R S, the tappet-case J will cease to rotate or oscillate, and of course the shuttle-boxes will not be moved from the position in which the pawls left them.

It will be seen from the above description that the success of my invention depends chiefly upon the intermittent motion and the reversal of the motion of the tappet-case J, which operation is brought about by the movements given to the pawls L L′ by means of the card-pattern.

I do not desire to confine my invention to the use of a single form of pattern-surface for weaving only a single figure. The object of the invention is to so contrive a loom that a great variety of figures can be produced at the same time, or at different times, by providing for throwing any one of the shuttles at will, whether it be next the case from which the last shuttle was thrown or from any other cell in the combination.

While I am enabled by my invention to throw the shuttles from their boxes in regular order, I am also enabled to skip over a cell or shuttle, and to throw the shuttle from the cell which is second from that from which the last shuttle was thrown.

Having thus described my invention, what I claim as new, and desire to secure by Letters Patent, is—

1. A power-loom which is provided with many-celled shuttle-boxes, the movements of which are automatically controlled in such manner that the cells of the boxes can be skipped over and any desired shuttle thrown from any box in the combination, according to the character or figure to be woven, substantially as described.

2. Providing for operating many-celled shuttle-boxes so as to bring any desired shuttle into action, by means of pawls, ratchets, and reversible tappets, in combination with pattern-surfaces which will control the figure to be woven, substantially as described.

3. The use of tappets which receive both a rotary and an oscillatory motion from a pattern or patterns, in combination with many-chambered shuttle-boxes, substantially as described.

CHRISTOPHER DUCKWORTH.

Witnesses:
R. T. CAMPBELL,
E. SCHAFER.